(12) United States Patent
Lee

(10) Patent No.: US 9,800,187 B2
(45) Date of Patent: Oct. 24, 2017

(54) METHOD FOR CONTROLLING PARALLEL-CONNECTED INVERTERS

(71) Applicant: LSIS CO., LTD., Anyang-si, Gyeonggi-do (KR)

(72) Inventor: Bong Ki Lee, Gunpo-si (KR)

(73) Assignee: LSIS CO., LTD., Anyang-si (KR)

( * ) Notice: Subject to any disclaimer, the term of this patent is extended or adjusted under 35 U.S.C. 154(b) by 0 days.

(21) Appl. No.: 14/582,639

(22) Filed: Dec. 24, 2014

(65) Prior Publication Data

US 2015/0188475 A1 Jul. 2, 2015

(30) Foreign Application Priority Data

Dec. 31, 2013 (KR) .......................... 10-2013-0168398

(51) Int. Cl.
| | | |
|---|---|---|
| *H02P 3/00* | (2006.01) | |
| *H02P 23/00* | (2016.01) | |
| *H02P 27/08* | (2006.01) | |
| *H02M 7/493* | (2007.01) | |

(52) U.S. Cl.
CPC ............ *H02P 23/00* (2013.01); *H02M 7/493* (2013.01); *H02P 27/08* (2013.01)

(58) Field of Classification Search
CPC ................................. H02P 23/00; H02P 27/08
USPC ........................................................ 318/500
See application file for complete search history.

(56) References Cited

U.S. PATENT DOCUMENTS

| | | | | |
|---|---|---|---|---|
| 8,674,652 B2* | 3/2014 | Maekawa | ................ | H02P 6/18 |
| | | | | 180/443 |
| 8,836,270 B2* | 9/2014 | Kajiura | .................. | H02P 27/08 |
| | | | | 318/41 |
| 2004/0056661 A1* | 3/2004 | Maeda | ................... | G01R 1/203 |
| | | | | 324/332 |
| 2005/0213695 A1* | 9/2005 | Shin-e | ..................... | H04L 7/042 |
| | | | | 375/354 |
| 2007/0013325 A1* | 1/2007 | Kiuchi | ...................... | H02P 5/74 |
| | | | | 318/34 |
| 2012/0319629 A1* | 12/2012 | Takaki | ............. | H02M 7/53875 |
| | | | | 318/400.02 |

(Continued)

FOREIGN PATENT DOCUMENTS

| | | |
|---|---|---|
| CN | 1674135 | 9/2005 |
| JP | 59-181974 | 10/1984 |
| JP | 2004-320964 | 11/2004 |

(Continued)

OTHER PUBLICATIONS

Korean Intellectual Property Office Application Serial No. 10-2013-0168398, Office Action dated Nov. 14, 2014, 4 pages.

(Continued)

*Primary Examiner* — Bentsu Ro
*Assistant Examiner* — Gabriel Agared
(74) *Attorney, Agent, or Firm* — Lee Hong Degerman Kang & Waimey

(57) ABSTRACT

A method for controlling parallel-connected inverters is provided. The method includes ascertaining a detection scope of a predetermined PWM synchronization signal when a PWM synchronization signal is received, calculating a synchronization error of a PWM carrier at a PWM synchronization signal reception point, and compensating the synchronization error at a peak of the PWM carrier.

6 Claims, 7 Drawing Sheets

(56) References Cited

U.S. PATENT DOCUMENTS

2014/0203756 A1* 7/2014 Kajiura .................. H02P 27/08
318/812

FOREIGN PATENT DOCUMENTS

| | | |
|---|---|---|
| JP | 2005-094933 | 4/2005 |
| JP | 2010-288420 | 12/2010 |
| JP | 5188656 | 4/2013 |
| KR | 10-2009-0096841 | 9/2009 |
| KR | 10-1304055 | 9/2013 |

OTHER PUBLICATIONS

Japan Patent Office Application Serial No. 2014-263359, Office Action dated Feb. 2, 2016, 3 pages.
State Intellectual Property Office of the People's Republic of China Application Serial No. 201410858279.7 Office Action dated Dec. 13, 2016, 7 pages.

* cited by examiner

METHOD FOR CONTROLLING PARALLEL-CONNECTED INVERTERS

CROSS-REFERENCE TO RELATED APPLICATIONS

Pursuant to 35 U.S.C. §119(a), this application claims the benefit of earlier filing date and right of priority to Korean Patent Application No. 10-2013-0168398, filed on Dec. 31, 2013, the contents of which are all hereby incorporated by reference herein in their entirety.

BACKGROUND OF THE INVENTION

Field of the Invention

The present disclosure relates to a method for controlling a plurality of parallel-connected invertors.

Description of Related Art

Generally, an inverter drives a motor by converting an AC (Alternating Current) power source into a DC (Direct Current) power source, and successively, outputting an AC voltage after switching the DC power source using switching elements such as IGBTs (Insulated Gate Bipolar Transistors) under control by a PWM (Pulse Width Modulation) signal inputted from a controller.

That is to say, an inverter is a machine configured to effectively control a motor, and therefore is designed to reduce power consumption of the motor and increase energy efficiency.

Meanwhile, in order to drive a large capacity motor, a large capacity inverter is also required. However, it is difficult to produce a large inverter because there are still existing limits in developing inverter's essential component such as IGBTs (Insulated Gate Bipolar Transistors) and diodes. Therefore, a large capacity motor is driven in a synchronous operation using a plurality of parallel-connected small inverters.

A plurality of parallel-connected small inverters may configure a large inverter. For this purpose, the parallel-connected inverters have to be driven where each of PWM carriers must be in synchronization. However, when a noise occurs in a PWM synchronization signal, the noise itself is recognized as a synchronization signal, and consequently, a corresponding PWM carrier is turned into '0'. This phenomenon causes irregular changes in the PWM carrier, which has been known as a technical problem in the conventional art.

In addition, when a PWM carrier is forcibly turned into '0', an output of the inverter trembles to generate another known technical problem in the conventional art.

[Reference 1] Korea Patent Registration No. 10-1304055 (published on 2013 Sep. 4)

[Reference 2] Japan Patent Publication No. 2010-288420 (published on 2010 Dec. 24)

SUMMARY OF THE INVENTION

The present disclosure is, to provide an improved method for controlling a plurality of parallel-connected inverters. The method compensates noises generated in a synchronization signal and resolves the sudden turn of PWM carrier into '0' to thereby prevent tremble of output of the inverter.

In order to solve the aforementioned technical challenge, there is provided a method for controlling each of a plurality of inverters in a system configured to drive a motor by a plurality of parallel-connected inverters, the method comprising:

ascertaining a detection scope of a predetermined PWM (Pulse Width Modulation) synchronization signal when a PWM synchronization signal is received;

calculating a synchronization error of a PWM carrier at a PWM synchronization signal reception point; and compensating the synchronization error at a peak of the PWM carrier.

Preferably, but not necessarily, the method may further comprise ignoring a relevant PWM synchronization signal, when the received PWM synchronization signal is out of the detection scope.

Preferably, but not necessarily, the method may further comprise reducing the detection scope of the PWM synchronization signal as much as a predetermined width, when no synchronization error of the PWM carrier is detected at the PWM synchronization signal reception point.

Preferably, but not necessarily, the method may further comprise maintaining the detection scope of the PWM synchronization signal, when the synchronization error of the PWM carrier is compensated.

Preferably, but not necessarily, the method may further comprise maintaining the detection scope of the PWM synchronization signal.

Preferably, but not necessarily, the method may further comprise enlarging the detection scope of the PWM synchronization signal as much as a predetermined width, when no PWM synchronization signal is received within the detection scope of the PWM synchronization signal.

ADVANTAGEOUS EFFECTS

According to an exemplary embodiment of the present disclosure, it is possible to categorize noise of PWM synchronization signals and prevent malfunction of an inverter.

Additionally, there is an advantageous effect that, trembling of the invertor's output may be prevented by compensating synchronization error of a PWM carrier and avoiding PWM carrier's forcible sudden turn into '0'.

Therefore, according to the exemplary embodiment of the present disclosure, a plurality of parallel-connected inverters may be stably driven.

DETAILED DESCRIPTION OF THE INVENTION

Various exemplary embodiments will be described more fully hereinafter with reference to the accompanying drawings, in which some exemplary embodiments are shown. The present inventive concept may, however, be embodied in many different forms and should not be construed as limited to the example embodiments set forth herein. Rather, the described aspect is intended to embrace all such alterations, modifications, variations, and equivalents that fall within the scope and novel idea of the present disclosure.

Now, exemplary embodiments of the present disclosure will be explained in detail together with the accompanying drawings.

Figure 1:
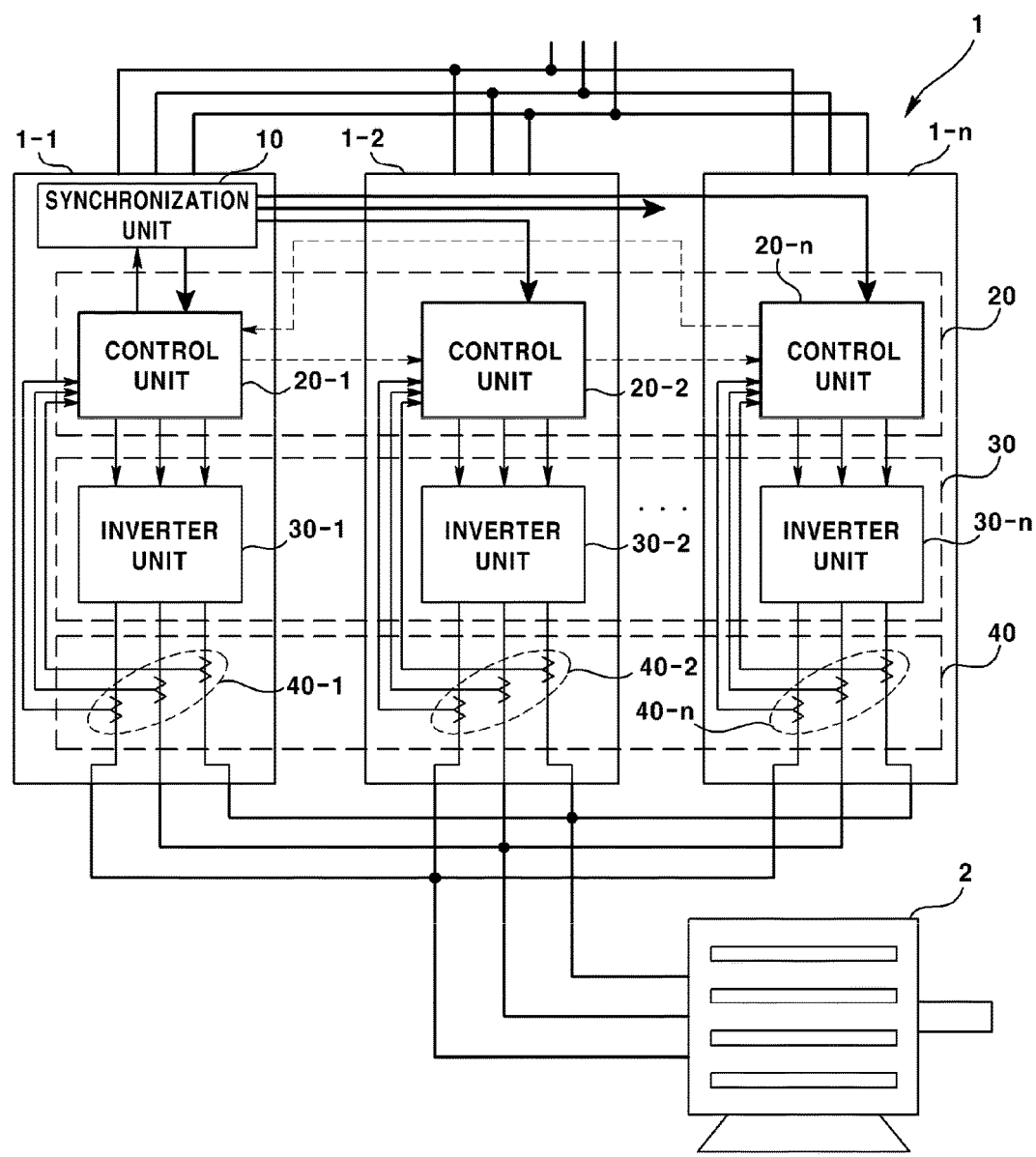
FIG. 1 is a block diagram illustrating a parallel-connected inverter system according to an exemplary embodiment of the present disclosure.

FIG. 1 is a block diagram illustrating a parallel-connected inverter system according to an exemplary embodiment of the present disclosure.

Referring to FIG. 1, in the parallel-connected inverter system according to an exemplary embodiment of the present disclosure, 3-phase electric power may be provided from a 3-phase electric power supply to a plurality of inverters (1). The 3-phase electric outputted from the plurality of inverters (1) may be inputted to a motor (2).

One inverter (1-1) selected from the plurality of inverters (1) may transmit a PWM synchronization signal to each of control units (20) in the plurality of inverters (1), where the inverter (1-1) includes a synchronization unit (10). Each of the plurality of control units (20) may control each of the corresponding inverter units (30) using the PWM synchronization signal, where each of the inverter units (30) includes a plurality of switching elements. In addition, 3-phase outputs from the inverter units (30) may be provided into the control units (20) in the plurality of the inverters (1) by current detection units (40), where each of the plurality of the inverters (1) includes the current detection unit (40).

Each of the control units (20) of the plurality of the inverters (1) performs one-way communication. That is, a control unit (20-1) of a first inverter (1-1) may transmit a signal to a control unit (20-2) of a second inverter (1-2). In the same way, a control unit (20-$n$) of the n-th inverter (1-$n$) may receive the signal from a control unit (20-($n$–1)) of the n–1th inverter (1-($n$–1)) and in turn transmit the signal to the control unit (20-1) of the first inverter (1-1).

The control unit (20-1) of the first inverter (1-1) may transmit a PWM synchronization signal to the synchronization unit (10).

In addition, the control unit (20) may provide a motor (2) with an AC (Alternating Current) voltage having a predetermined voltage and frequency, by controlling the inverter unit (30) switching through PWM carrier synchronization using a PWM synchronization signal. The controlling of switching elements in the inverter units (30) using a PWM carrier is well known to the skilled in the art such that no more detailed explanation will be made thereto.

The system as shown in FIG. 1, may drive a large capacity motor (2) using a plurality of the inverters (1) with small quantity. In order to drive such system, each of the inverters (1) must be driven at the same time and in the same volume where each of which PWM carriers is synchronized.

Figure 2:
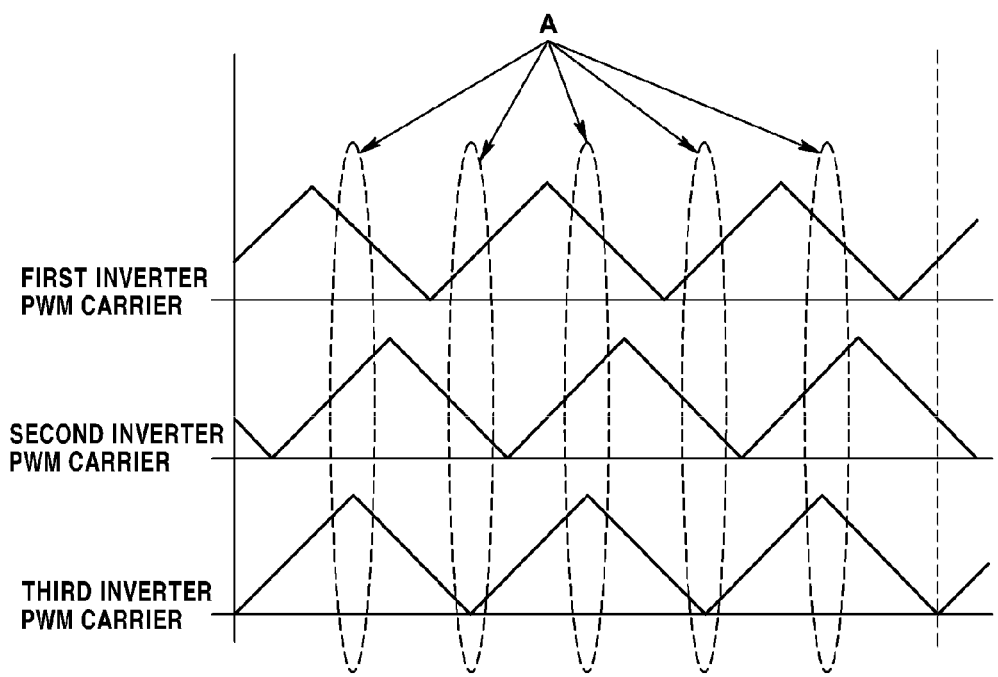
FIG. 2 is an exemplary view illustrating each of PWM carriers of inverters when a carrier synchronization is not performed.
Figure 3:
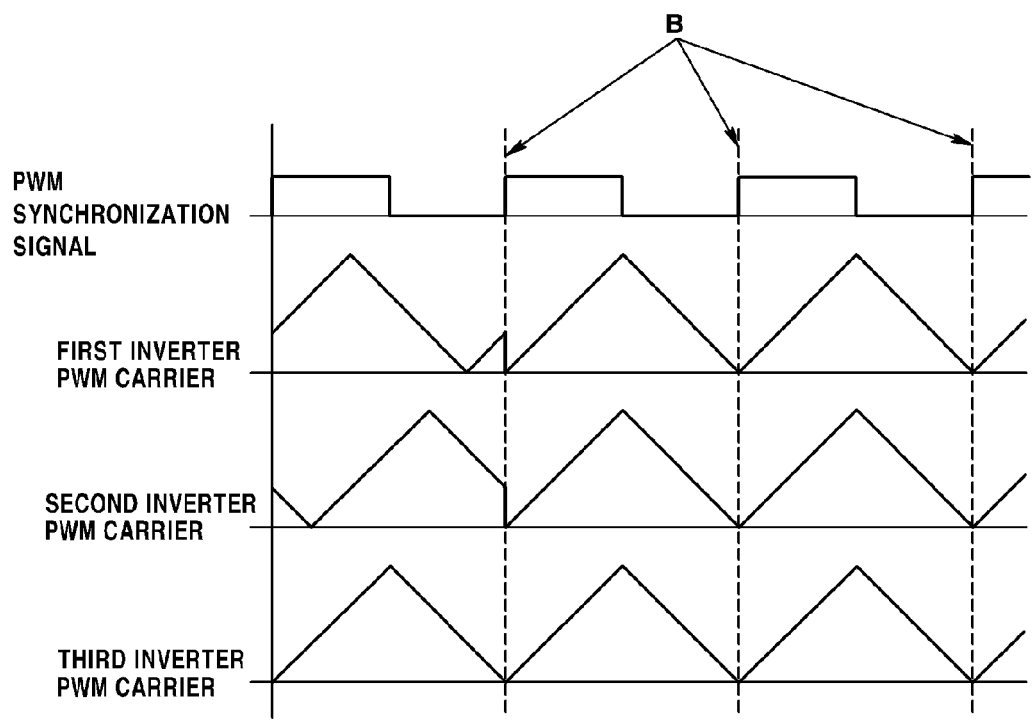
FIG. 3 is an exemplary view illustrating each of PWM carriers of inverters when a carrier synchronization is performed.

FIG. 2 is an exemplary view illustrating each of PWM carriers of inverters when a carrier synchronization is not performed, and FIG. 3 is an exemplary view illustrating each of PWM carriers of inverters when a carrier synchronization is performed.

As shown in FIG. 2, when each of the inverters is driven separately without PWM carrier synchronization, circulating currents occurs at points (A) causing the inverter failure.

Therefore, as shown in FIG. 3, the synchronization unit (10) provides a PWM synchronization signal to a plurality of inverters (1), and synchronizes the PWM carriers to prevent occurrence of the circulating current.

In other words, the conventional method for controlling inverters is to forcibly synchronize the PWM carriers by changing off the PWM carriers into '0', at the PWM synchronization signal's reception points (B). However, such conventional method has a problem that a critical disorder may happen in PWM outputs when a noise occurs in the PWM synchronization signal, although the conventional method may initially synchronize the PWM carriers easily.

Figure 4:
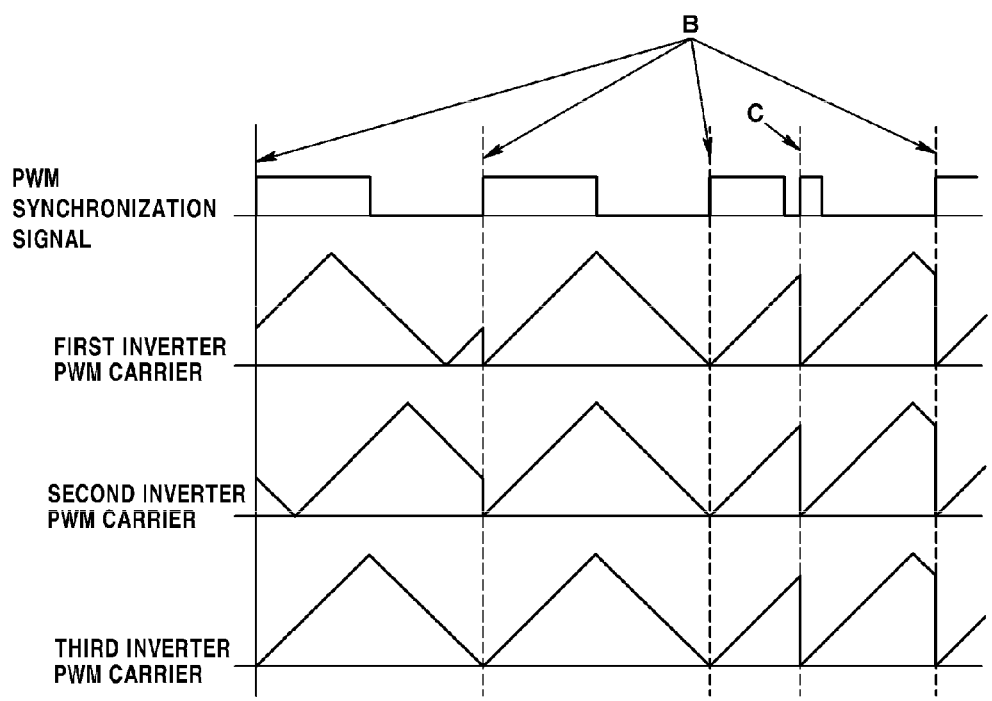
FIG. 4 is an exemplary view illustrating a technical problem of the conventional method for controlling inverters.

FIG. 4 is an exemplary view illustrating a technical problem of the conventional method for controlling inverters.

As shown in FIG. 4, the PWM carriers are turned into '0' at the PWM synchronization signal's reception points (B). However, if a noise occurs in the PWM synchronization signal, the PWM carrier comes to be turned into '0' again at the noise occurring point (C). Such forcible '0' turn of the PWM carrier causes sudden cutoff of the current outputted from the inverter units (30). Consequently, the output of the inverters (1) is resulted to tremble at the synchronization points.

In order to solve out the aforementioned problems, exemplary embodiments of the present disclosure will describe the methods for resolving the noise in the PWM synchronization signals and the consequent trembling of the inverter outputs.

Figure 5:
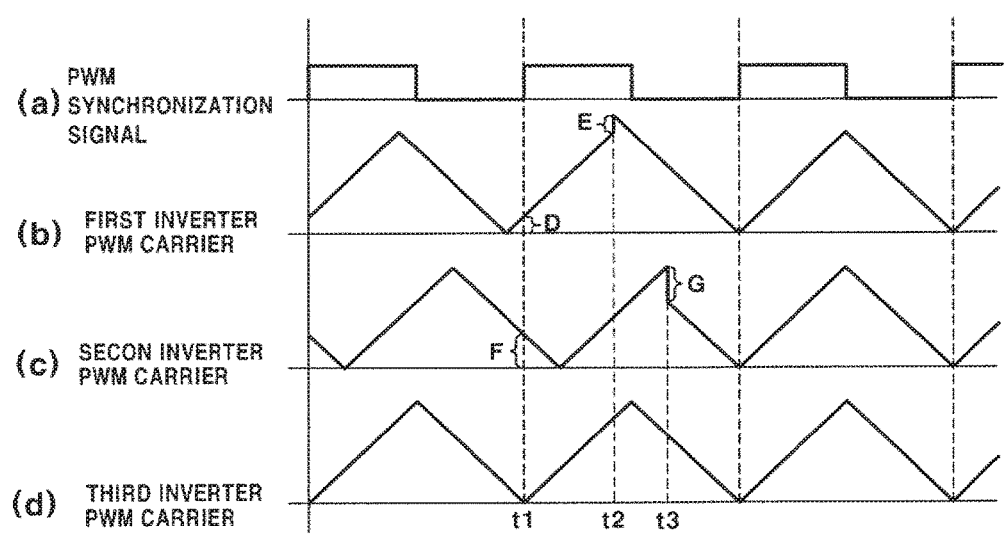
FIGS. 5 and 6 are exemplary views illustrating a method for controlling inverters according to the present disclosure.
Figure 6:
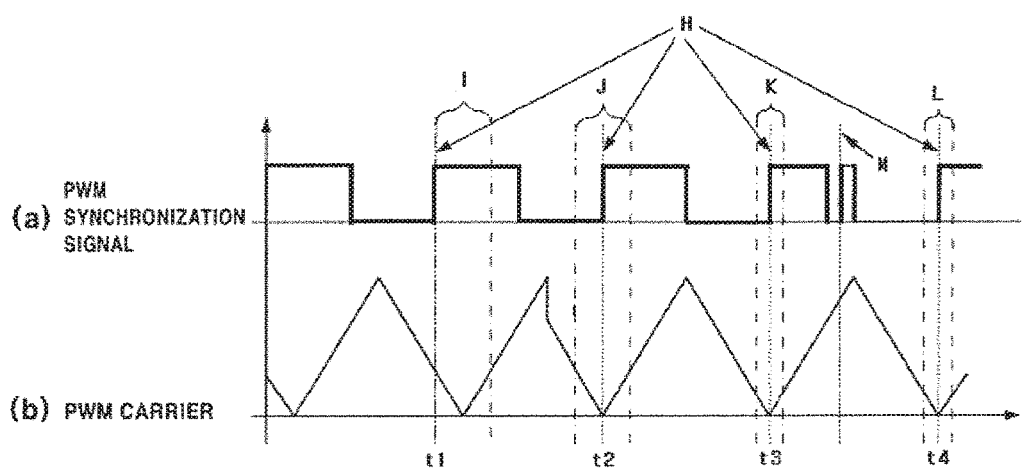

FIGS. 5 and 6 are exemplary views illustrating a method for controlling inverters according to the present disclosure.

Referring to FIG. 5, (a) represents a PWM synchronization signal provided from the synchronization unit (10) to each of the control units (20) in the inverters (1). (b) to (d) respectively, represent PWM carriers provided from each of the control units (20) to the corresponding inverter units (30) in the inverters (1).

Although only 3 examples of PWM carriers have been provided, the present inventive concept should not be construed as limited to the example embodiments set forth herein. Rather, it is apparent that each of n-numbered (n: natural number, not less than 2) PWM carriers may be respectively synchronized when n-numbered inverters (1) are parallel-connected.

As shown in FIG. 5, according to an exemplary embodiment of the present disclosure, each of the control units (20) may ascertain a PWM carrier's synchronization error at a PWM synchronization signal reception point and compensate the synchronization error at a peak of the PWM carrier.

That is, as to a first inverter's PWM carrier (b), the control unit (20) of the first inverter may synchronize a PWM carrier by ascertaining a synchronization error (D) at a PWM synchronization signal input point (t1) and compensating (E) the synchronization error (D) at a peak point (t2) of the relevant PWM carrier.

In addition, as to a second inverter's PWM carrier (c), the control unit (20) of the second inverter may synchronize a PWM carrier by ascertaining a synchronization error (F) at a PWM synchronization signal input point (t1) and compensating (G) the synchronization error (D) at a peak point (t3) of the relevant PWM carrier.

Additionally, as shown in FIG. 6, according to an exemplary embodiment of the present disclosure, each of the control units (20) may determine a detection scope for the PWM synchronization signal. That is, the control unit (20) may set predetermined detection scopes (I to L) from a point (H) at which a PWM carrier is '0'. When a PWM synchronization signal is received within the predetermined scopes (I to L), the control unit (20) may recognize the signal as a normal PWM synchronization. Otherwise, when a PWM synchronization signal is received at the other point (M), the control unit (20) may recognize the signal as a noise.

Figure 7:
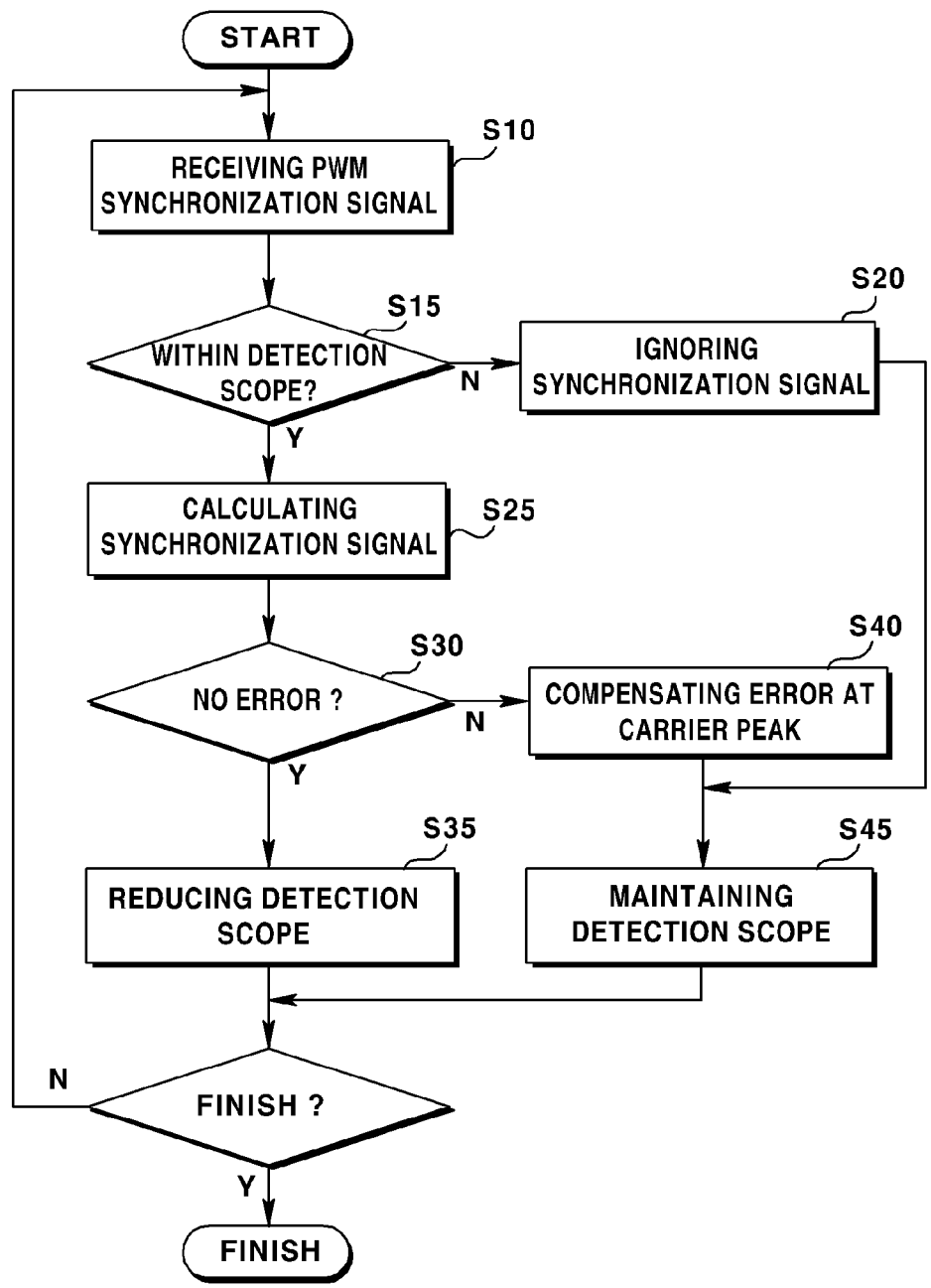
FIG. 7 is a flowchart illustrating a method for controlling a plurality of parallel-connected inverters according to an exemplary embodiment of the present disclosure.

FIG. 7 is a flowchart illustrating a method for controlling a plurality of parallel-connected inverters according to an exemplary embodiment of the present disclosure.

As shown in FIG. 7, according to an exemplary embodiment of the present disclosure, each of the control units (20) of the inverters (1) may receive a PWM synchronization signal from a synchronization unit (10) (S10) and ascertain whether the PWM synchronization signal is received within the PWM synchronization signal's detection scope (for example, such as 1 in FIG. 6) or not (S15). When the PWM synchronization is received out of the detection scope, the control unit (20) may recognize the received signal as a noise and ignore the noise (S20). In this case, the PWM synchronization signal's detection scope may be maintained (S45). In other words, for example, if the PWM synchronization signal is received out of the predetermined detection scope in FIG. 6, where a relevant detection scope may be maintained as t4 (K→L) at a point (M) between the point (t3) and the point (t4).

Meanwhile, if it is ascertained that the PWM synchronization is within the detection scope in step S15, the control unit (20) may calculate a synchronization error of a PWM carrier at a reception point of the PWM synchronization signal (S25).

In a result of step S25, if it is determined that no synchronization error is calculated (S30), the detection scope may be reduced (S35). In other words, for example, because there is no synchronization error at a point (t2) in FIG. 6, the control unit (20) may reduce the detection scope of the synchronization signal as t3 (J→K).

Meanwhile, if it is ascertained that there is any synchronization error in step S30, the control unit (20) may compensate the synchronization error at a peak of the PWM carrier (S40), and maintain the detection scope of the synchronization signal (S45). That is, for example, the control unit (20) may compensate, at the PWM carrier's peak, the synchronization error generated in the point (t1), and maintain the synchronization signal's detection scope in the point (t2) (I→J).

Although not shown in drawings, the detection scope of the PWM synchronization signal may be enlarged, when no PWM synchronization signal is received within the detection scope of the PWM synchronization signal.

As apparent from the foregoing, the control unit (20) of the present disclosure may change the detection scope of a PWM synchronization signal. The purpose of this action is to cope with noises by setting a detection scope to a large scale when a large amount of noises occur at an initial stage of driving inverters, and then reducing the detection scope after the inverter's PWM carrier is in synchronization.

Width of the PWM synchronization signal detection scope's change (that is, enlargement and/or reduction) may be predetermined by a setting.

According to an exemplary embodiment of the present disclosure, it is possible to advantageously categorize noise of PWM synchronization signals and prevent malfunction of an inverter. Additionally, there is an advantageous effect that, trembling of the invertor output can be prevented by compensating synchronization error of a PWM carrier and avoiding PWM carrier's forcible sudden turn into '0'.

Therefore, a plurality of parallel-connected inverters can be stably driven according to the exemplary embodiment of the present disclosure.

The abovementioned embodiments are intended to be illustrative, and not to limit the scope of the claims. Many alternatives, modifications, variations, and equivalents will be apparent to those skilled in the art. The features, structures, methods, and other characteristics of the exemplary embodiments described herein may be combined in various ways to obtain additional and/or alternative exemplary embodiments. Therefore, the technical scope of the rights for the present disclosure shall be decided by claims.

What is claimed is:

1. A method for controlling parallel-connected inverters in a system configured to drive a motor by a plurality of parallel-connected inverters, the method comprising:
   setting up a detection period for a Pulse Width Modulation (PWM) synchronization signal to prevent noise from being erroneously recognized as the PWM synchronization signal;
   checking whether the PWM synchronization signal is received during the detection period for the PWM synchronization signal;
   calculating a synchronization error of a PWM carrier at a PWM synchronization signal reception point when the PWM synchronization signal is recognized as a normal PWM synchronization,
   compensating the synchronization error at a peak of the PWM carrier; and
   adjusting a length of the detection period for the PWM synchronization signal based on a result of the checking whether a PWM synchronization signal is received or not,
   wherein the setting up the detection period sets the detection period from a point at which a PWM carrier is zero (0), and
   wherein the checking whether the PWM synchronization signal is received during the detection period recognizes the PWM synchronization signal as the normal PWM synchronization when the PWM synchronization signal is received within the detection period.

2. The method of claim 1, further comprising:
   when the PWM synchronization signal is received at a time this is outside of the detection period,
   ignoring the received PWM synchronization signal as being a pseudo PWM synchronization signal.

3. The method of claim 2, further comprising:
   maintaining a length of the detection period for the PWM synchronization signal.

4. The method of claim 1, further comprising:
   enlarging a length of the detection period for the PWM synchronization signal, when no PWM synchronization signal has been received during the detection period for the PWM synchronization signal.

5. The method of claim 1, further comprising:
   reducing a length of the detection period for the PWM synchronization signal, when the synchronization error of the PWM carrier has been generated based on a result of the calculating when the PWM synchronization signal is received.

6. The method of claim 1, further comprising:
   maintaining a length of the detection period for the PWM synchronization signal, when the synchronization error of the PWM carrier has been generated based on a result of the calculating when the PWM synchronization signal is received.

* * * * *